US008468192B1

(12) United States Patent
Langhammer (10) Patent No.: US 8,468,192 B1
(45) Date of Patent: Jun. 18, 2013

(54) IMPLEMENTING MULTIPLIERS IN A PROGRAMMABLE INTEGRATED CIRCUIT DEVICE (75) Inventor: Martin Langhammer, Salisbury (GB)

(73) Assignee: Altera Corporation, San Jose, CA (US)

( * ) Notice: Subject to any disclaimer, the term of this patent is extended or adjusted under 35 U.S.C. 154(b) by 1142 days.

(21) Appl. No.: 12/396,766

(22) Filed: Mar. 3, 2009

(51) Int. Cl.
*G06F 7/52* (2006.01)

(52) U.S. Cl.
USPC .......................................... 708/620; 708/625

(58) Field of Classification Search
USPC ........................ 708/492, 620, 625, 627–632
See application file for complete search history.

(56) References Cited

U.S. PATENT DOCUMENTS

| 3,473,160 A | 10/1969 | Wahlstrom |
| 4,156,927 A | 5/1979 | McElroy et al. |
| 4,179,746 A | 12/1979 | Tubbs |
| 4,212,076 A | 7/1980 | Conners |
| 4,215,406 A | 7/1980 | Gomola et al. |
| 4,215,407 A | 7/1980 | Gomola et al. |
| 4,422,155 A | 12/1983 | Amir et al. |
| 4,484,259 A | 11/1984 | Palmer et al. |
| 4,521,907 A | 6/1985 | Amir et al. |
| 4,575,812 A | 3/1986 | Kloker et al. |
| 4,597,053 A | 6/1986 | Chamberlin |
| 4,616,330 A | 10/1986 | Betz |
| 4,623,961 A | 11/1986 | Mackiewicz |
| 4,682,302 A | 7/1987 | Williams |
| 4,718,057 A | 1/1988 | Venkitakrishnan et al. |
| 4,727,508 A | 2/1988 | Williams |
| 4,736,335 A | 4/1988 | Barkan |
| 4,791,590 A | 12/1988 | Ku et al. |
| 4,799,004 A | 1/1989 | Mori |
| 4,823,295 A | 4/1989 | Mader |
| 4,839,847 A | 6/1989 | Laprade |
| 4,871,930 A | 10/1989 | Wong et al. |

(Continued)

FOREIGN PATENT DOCUMENTS

| EP | 0 158 430 | 10/1985 |
| EP | 0 380 456 | 8/1990 |

(Continued)

OTHER PUBLICATIONS

Xilinx Inc., "Xtreme DSP for Virtex-4 FPGAs User Guide," v1.2, Feb. 2005.*

(Continued)

*Primary Examiner* — Chuong D Ngo
*Assistant Examiner* — Matthew Sandifer
(74) *Attorney, Agent, or Firm* — Ropes & Gray LLP; Jeffrey H. Ingerman (57) ABSTRACT

The number of multipliers of a particular size that are required to perform a multiplication larger than that size is reduced. In the example of a 36-bit-by-36-bit multiplication, the number of 18-bit-by-18-bit multipliers required may be reduced from four to three. This may be achieved by using recursive decomposition techniques. As discussed in more detail below, if for each of two 36-bit numbers, the "digits" of each respective 36-bit number are added together, and then the two sums are multiplied, the resulting term can be combined additively with the product of the least-significant group of bits of the two 36-bit numbers and the product of the most-significant group of bits of the two 36-bit numbers to provide the desired product. A specialized processing block includes structures to facilitate the recursive decomposition technique.

10 Claims, 8 Drawing Sheets

U.S. PATENT DOCUMENTS

| | | | |
|---|---|---|---|
| 4,912,345 A | 3/1990 | Steele et al. |
| 4,918,637 A | 4/1990 | Morton |
| 4,967,160 A | 10/1990 | Quievy et al. |
| 4,982,354 A | 1/1991 | Takeuchi et al. |
| 4,991,010 A | 2/1991 | Hailey et al. |
| 4,994,997 A | 2/1991 | Martin et al. |
| 5,073,863 A | 12/1991 | Zhang |
| 5,081,604 A | 1/1992 | Tanaka |
| 5,122,685 A | 6/1992 | Chan et al. |
| 5,128,559 A | 7/1992 | Steele |
| 5,175,702 A | 12/1992 | Beraud et al. |
| 5,208,491 A | 5/1993 | Ebeling et al. |
| RE34,363 E | 8/1993 | Freeman |
| 5,267,187 A | 11/1993 | Hsieh et al. |
| 5,296,759 A | 3/1994 | Sutherland et al. |
| 5,338,983 A | 8/1994 | Agarwala |
| 5,339,263 A | 8/1994 | White |
| 5,349,250 A | 9/1994 | New |
| 5,357,152 A | 10/1994 | Jennings, III et al. |
| 5,371,422 A | 12/1994 | Patel et al. |
| 5,375,079 A | 12/1994 | Uramoto et al. |
| 5,381,357 A | 1/1995 | Wedgwood et al. |
| 5,404,324 A | 4/1995 | Colon-Bonet |
| 5,424,589 A | 6/1995 | Dobbelaere et al. |
| 5,446,651 A | 8/1995 | Moyse et al. |
| 5,451,948 A | 9/1995 | Jekel |
| 5,452,231 A | 9/1995 | Butts et al. |
| 5,452,375 A | 9/1995 | Rousseau et al. |
| 5,457,644 A | 10/1995 | McCollum |
| 5,465,226 A | 11/1995 | Goto |
| 5,465,375 A | 11/1995 | Thepaut et al. |
| 5,483,178 A | 1/1996 | Costello et al. |
| 5,497,498 A | 3/1996 | Taylor |
| 5,500,812 A | 3/1996 | Saishi et al. |
| 5,500,828 A | 3/1996 | Doddington et al. |
| 5,523,963 A | 6/1996 | Hsieh et al. |
| 5,528,550 A | 6/1996 | Pawate et al. |
| 5,537,601 A | 7/1996 | Kimura et al. |
| 5,541,864 A | 7/1996 | Van Bavel et al. |
| 5,546,018 A | 8/1996 | New et al. |
| 5,550,993 A | 8/1996 | Ehlig et al. |
| 5,559,450 A | 9/1996 | Ngai et al. |
| 5,563,526 A | 10/1996 | Hastings et al. |
| 5,563,819 A | 10/1996 | Nelson |
| 5,570,039 A | 10/1996 | Oswald et al. |
| 5,570,040 A | 10/1996 | Lytle et al. |
| 5,572,148 A | 11/1996 | Lytle et al. |
| 5,581,501 A | 12/1996 | Sansbury et al. |
| 5,590,350 A | 12/1996 | Guttag et al. |
| 5,594,366 A | 1/1997 | Khong et al. |
| 5,594,912 A | 1/1997 | Brueckmann et al. |
| 5,596,763 A | 1/1997 | Guttag et al. |
| 5,606,266 A | 2/1997 | Pedersen |
| 5,617,058 A | 4/1997 | Adrian et al. |
| 5,631,848 A | 5/1997 | Laczko et al. |
| 5,633,601 A | 5/1997 | Nagaraj |
| 5,636,150 A | 6/1997 | Okamoto |
| 5,636,368 A | 6/1997 | Harrison et al. |
| 5,640,578 A | 6/1997 | Balmer et al. |
| 5,644,519 A | 7/1997 | Yatim |
| 5,644,522 A | 7/1997 | Moyse et al. |
| 5,646,545 A | 7/1997 | Trimberger et al. |
| 5,646,875 A | 7/1997 | Taborn et al. |
| 5,648,732 A | 7/1997 | Duncan |
| 5,652,903 A | 7/1997 | Weng et al. |
| 5,655,069 A | 8/1997 | Ogawara et al. |
| 5,664,192 A | 9/1997 | Lloyd et al. |
| 5,689,195 A | 11/1997 | Cliff et al. |
| 5,696,708 A | 12/1997 | Leung |
| 5,729,495 A | 3/1998 | Madurawe |
| 5,740,404 A | 4/1998 | Baji |
| 5,744,980 A | 4/1998 | McGowan et al. |
| 5,744,991 A | 4/1998 | Jefferson et al. |
| 5,754,459 A | 5/1998 | Telikepalli |
| 5,761,483 A | 6/1998 | Trimberger |
| 5,764,555 A | 6/1998 | McPherson et al. |
| 5,768,613 A | 6/1998 | Asghar |
| 5,771,186 A | 6/1998 | Kodali et al. |
| 5,777,912 A | 7/1998 | Leung et al. |
| 5,784,636 A | 7/1998 | Rupp |
| 5,790,446 A | 8/1998 | Yu et al. |
| 5,794,067 A | 8/1998 | Kadowaki |
| 5,801,546 A | 9/1998 | Pierce et al. |
| 5,805,477 A | 9/1998 | Perner |
| 5,805,913 A | 9/1998 | Guttag et al. |
| 5,808,926 A | 9/1998 | Gorshtein et al. |
| 5,812,479 A | 9/1998 | Cliff et al. |
| 5,812,562 A | 9/1998 | Baeg |
| 5,815,422 A | 9/1998 | Dockser |
| 5,821,776 A | 10/1998 | McGowan |
| 5,825,202 A | 10/1998 | Tavana et al. |
| 5,838,165 A | 11/1998 | Chatter |
| 5,841,684 A | 11/1998 | Dockser |
| 5,847,579 A | 12/1998 | Trimberger |
| 5,847,978 A | 12/1998 | Ogura et al. |
| 5,847,981 A | 12/1998 | Kelley et al. |
| 5,859,878 A | 1/1999 | Phillips et al. |
| 5,869,979 A | 2/1999 | Bocchino |
| 5,872,380 A | 2/1999 | Rostoker et al. |
| 5,874,834 A | 2/1999 | New |
| 5,878,250 A | 3/1999 | LeBlanc |
| 5,880,981 A | 3/1999 | Kojima et al. |
| 5,892,962 A | 4/1999 | Cloutier |
| 5,894,228 A | 4/1999 | Reddy et al. |
| 5,898,602 A | 4/1999 | Rothman et al. |
| 5,931,898 A | 8/1999 | Khoury |
| 5,942,914 A | 8/1999 | Reddy et al. |
| 5,944,774 A | 8/1999 | Dent |
| 5,949,710 A | 9/1999 | Pass et al. |
| 5,951,673 A | 9/1999 | Miyata |
| 5,956,265 A | 9/1999 | Lewis |
| 5,959,871 A | 9/1999 | Pierzchala et al. |
| 5,960,193 A | 9/1999 | Guttag et al. |
| 5,961,635 A | 10/1999 | Guttag et al. |
| 5,963,048 A | 10/1999 | Harrison et al. |
| 5,963,050 A | 10/1999 | Young et al. |
| 5,968,196 A | 10/1999 | Ramamurthy et al. |
| 5,970,254 A | 10/1999 | Cooke et al. |
| 5,978,260 A | 11/1999 | Trimberger et al. |
| 5,982,195 A | 11/1999 | Cliff et al. |
| 5,986,465 A | 11/1999 | Mendel |
| 5,991,788 A | 11/1999 | Mintzer |
| 5,991,898 A | 11/1999 | Rajski et al. |
| 5,995,748 A | 11/1999 | Guttag et al. |
| 5,999,015 A | 12/1999 | Cliff et al. |
| 5,999,990 A | 12/1999 | Sharrit et al. |
| 6,005,806 A | 12/1999 | Madurawe et al. |
| 6,006,321 A | 12/1999 | Abbott |
| 6,009,451 A | 12/1999 | Burns |
| 6,018,755 A | 1/2000 | Gonikberg et al. |
| 6,020,759 A | 2/2000 | Heile |
| 6,021,423 A | 2/2000 | Nag et al. |
| 6,029,187 A | 2/2000 | Verbauwhede |
| 6,031,763 A | 2/2000 | Sansbury |
| 6,041,339 A | 3/2000 | Yu et al. |
| 6,041,340 A | 3/2000 | Mintzer |
| 6,052,327 A | 4/2000 | Reddy et al. |
| 6,052,755 A | 4/2000 | Terrill et al. |
| 6,055,555 A | 4/2000 | Boswell et al. |
| 6,064,614 A | 5/2000 | Khoury |
| 6,065,131 A | 5/2000 | Andrews et al. |
| 6,066,960 A | 5/2000 | Pedersen |
| 6,069,487 A | 5/2000 | Lane et al. |
| 6,072,994 A | 6/2000 | Phillips et al. |
| 6,073,154 A | 6/2000 | Dick |
| 6,075,381 A | 6/2000 | LaBerge |
| 6,084,429 A | 7/2000 | Trimberger |
| 6,085,317 A | 7/2000 | Smith |
| 6,091,261 A | 7/2000 | DeLange |
| 6,091,765 A | 7/2000 | Pietzold, III et al. |
| 6,094,726 A | 7/2000 | Gonion et al. |
| 6,097,988 A | 8/2000 | Tobias |
| 6,098,163 A | 8/2000 | Guttag et al. |
| 6,107,820 A | 8/2000 | Jefferson et al. |
| 6,107,821 A | 8/2000 | Kelem et al. |
| 6,107,824 A | 8/2000 | Reddy et al. |
| 6,130,554 A | 10/2000 | Kolze et al. |

| | | | | | | |
|---|---|---|---|---|---|---|
| 6,140,839 A | 10/2000 | Kaviani et al. | | 6,971,083 B1 | 11/2005 | Farrugia et al. |
| 6,144,980 A | 11/2000 | Oberman | | 6,978,287 B1 | 12/2005 | Langhammer |
| 6,154,049 A | 11/2000 | New | | 6,983,300 B2 | 1/2006 | Ferroussat |
| 6,157,210 A | 12/2000 | Zaveri et al. | | 7,020,673 B2 | 3/2006 | Ozawa |
| 6,163,788 A | 12/2000 | Chen et al. | | 7,047,272 B2 | 5/2006 | Giacalone et al. |
| 6,167,415 A | 12/2000 | Fischer et al. | | 7,062,526 B1 | 6/2006 | Hoyle |
| 6,175,849 B1 | 1/2001 | Smith | | 7,093,204 B2 | 8/2006 | Oktem et al. |
| 6,215,326 B1 | 4/2001 | Jefferson et al. | | 7,107,305 B2 | 9/2006 | Deng et al. |
| 6,226,735 B1 | 5/2001 | Mirsky | | 7,113,969 B1 | 9/2006 | Green et al. |
| 6,242,947 B1 | 6/2001 | Trimberger | | 7,181,484 B2 | 2/2007 | Stribaek et al. |
| 6,243,729 B1 | 6/2001 | Staszewski | | 7,313,585 B2 | 12/2007 | Winterrowd |
| 6,246,258 B1 | 6/2001 | Lesea | | 7,395,298 B2 | 7/2008 | Debes et al. |
| 6,260,053 B1 | 7/2001 | Maulik et al. | | 7,401,109 B2 * | 7/2008 | Koc et al. ............... 708/625 |
| 6,279,021 B1 | 8/2001 | Takano et al. | | 7,409,417 B2 | 8/2008 | Lou |
| 6,286,024 B1 | 9/2001 | Yano et al. | | 7,415,542 B2 | 8/2008 | Hennedy et al. |
| 6,314,442 B1 | 11/2001 | Suzuki | | 7,421,465 B1 | 9/2008 | Rarick et al. |
| 6,314,551 B1 | 11/2001 | Borland | | 7,428,565 B2 | 9/2008 | Fujimori |
| 6,321,246 B1 | 11/2001 | Page et al. | | 7,428,566 B2 | 9/2008 | Siu et al. |
| 6,323,680 B1 | 11/2001 | Pedersen et al. | | 7,430,578 B2 | 9/2008 | Debes et al. |
| 6,327,605 B2 | 12/2001 | Arakawa et al. | | 7,430,656 B2 | 9/2008 | Sperber et al. |
| 6,351,142 B1 | 2/2002 | Abbott | | 7,447,310 B2 * | 11/2008 | Koc et al. ............... 380/28 |
| 6,353,843 B1 | 3/2002 | Chehrazi et al. | | 7,472,155 B2 | 12/2008 | Simkins et al. |
| 6,359,468 B1 | 3/2002 | Park et al. | | 7,508,936 B2 * | 3/2009 | Eberle et al. ............ 380/30 |
| 6,360,240 B1 | 3/2002 | Takano et al. | | 7,536,430 B2 | 5/2009 | Guevokian et al. |
| 6,362,650 B1 | 3/2002 | New et al. | | 7,567,997 B2 * | 7/2009 | Simkins et al. .......... 708/523 |
| 6,366,944 B1 | 4/2002 | Hossain et al. | | 7,590,676 B1 | 9/2009 | Langhammer |
| 6,367,003 B1 | 4/2002 | Davis | | 7,646,430 B2 | 1/2010 | Brown Elliott et al. |
| 6,369,610 B1 | 4/2002 | Cheung et al. | | 7,668,896 B2 | 2/2010 | Lutz et al. |
| 6,377,970 B1 | 4/2002 | Abdallah et al. | | 7,719,446 B2 | 5/2010 | Rosenthal et al. |
| 6,407,576 B1 | 6/2002 | Ngai et al. | | 7,769,797 B2 | 8/2010 | Cho et al. |
| 6,407,694 B1 | 6/2002 | Cox et al. | | 7,822,799 B1 | 10/2010 | Langhammer et al. |
| 6,427,157 B1 | 7/2002 | Webb | | 7,930,335 B2 * | 4/2011 | Gura et al. ............... 708/492 |
| 6,434,587 B1 | 8/2002 | Liao et al. | | 7,930,336 B2 | 4/2011 | Langhammer |
| 6,438,569 B1 | 8/2002 | Abbott | | 2001/0023425 A1 | 9/2001 | Oberman et al. |
| 6,438,570 B1 | 8/2002 | Miller | | 2001/0029515 A1 | 10/2001 | Mirsky |
| 6,446,107 B1 | 9/2002 | Knowles | | 2001/0037352 A1 | 11/2001 | Hong |
| 6,453,382 B1 | 9/2002 | Heile | | 2002/0002573 A1 | 1/2002 | Landers et al. |
| 6,467,017 B1 | 10/2002 | Ngai et al. | | 2002/0038324 A1 | 3/2002 | Page et al. |
| 6,480,980 B2 | 11/2002 | Koe | | 2002/0049798 A1 | 4/2002 | Wang et al. |
| 6,483,343 B1 | 11/2002 | Faith et al. | | 2002/0078114 A1 | 6/2002 | Wang et al. |
| 6,487,575 B1 | 11/2002 | Oberman | | 2002/0089348 A1 | 7/2002 | Langhammer |
| 6,523,055 B1 | 2/2003 | Yu et al. | | 2002/0116434 A1 | 8/2002 | Nancekievill |
| 6,523,057 B1 | 2/2003 | Savo et al. | | 2003/0088757 A1 | 5/2003 | Lindner et al. |
| 6,531,888 B2 | 3/2003 | Abbott | | 2004/0064770 A1 | 4/2004 | Xin |
| 6,538,470 B1 | 3/2003 | Langhammer et al. | | 2004/0083412 A1 | 4/2004 | Corbin et al. |
| 6,542,000 B1 | 4/2003 | Black et al. | | 2004/0103133 A1 | 5/2004 | Gurney |
| 6,556,044 B2 | 4/2003 | Langhammer et al. | | 2004/0122882 A1 | 6/2004 | Zakharov et al. |
| 6,557,092 B1 | 4/2003 | Callen | | 2004/0148321 A1 | 7/2004 | Guevorkian et al. |
| 6,571,268 B1 | 5/2003 | Giacalone et al. | | 2004/0172439 A1 | 9/2004 | Lin |
| 6,573,749 B2 | 6/2003 | New et al. | | 2004/0178818 A1 | 9/2004 | Crotty et al. |
| 6,574,762 B1 | 6/2003 | Karimi et al. | | 2004/0193981 A1 | 9/2004 | Clark et al. |
| 6,591,283 B1 | 7/2003 | Conway et al. | | 2004/0267857 A1 | 12/2004 | Abel et al. |
| 6,591,357 B2 | 7/2003 | Mirsky | | 2004/0267863 A1 | 12/2004 | Bhushan et al. |
| 6,600,495 B1 | 7/2003 | Boland et al. | | 2005/0038842 A1 | 2/2005 | Stoye |
| 6,600,788 B1 | 7/2003 | Dick et al. | | 2005/0144212 A1 | 6/2005 | Simkins et al. |
| 6,628,140 B2 | 9/2003 | Langhammer et al. | | 2005/0144215 A1 | 6/2005 | Simkins et al. |
| 6,687,722 B1 | 2/2004 | Larsson et al. | | 2005/0144216 A1 | 6/2005 | Simkins et al. |
| 6,692,534 B1 | 2/2004 | Wang et al. | | 2005/0166038 A1 | 7/2005 | Wang et al. |
| 6,700,581 B2 | 3/2004 | Baldwin et al. | | 2005/0187997 A1 | 8/2005 | Zheng et al. |
| 6,725,441 B1 | 4/2004 | Keller et al. | | 2005/0187999 A1 | 8/2005 | Zheng et al. |
| 6,728,901 B1 | 4/2004 | Rajski et al. | | 2005/0262175 A1 | 11/2005 | Iino et al. |
| 6,731,133 B1 | 5/2004 | Feng et al. | | 2006/0020655 A1 | 1/2006 | Lin |
| 6,732,134 B1 | 5/2004 | Rosenberg et al. | | 2007/0083585 A1 * | 4/2007 | St Denis et al. .......... 708/492 |
| 6,744,278 B1 | 6/2004 | Liu et al. | | 2007/0185951 A1 | 8/2007 | Lee et al. |
| 6,745,254 B2 | 6/2004 | Boggs et al. | | 2007/0185952 A1 | 8/2007 | Langhammer et al. |
| 6,763,367 B2 | 7/2004 | Kwon et al. | | 2007/0241773 A1 | 10/2007 | Hutchings et al. |
| 6,771,094 B1 | 8/2004 | Langhammer et al. | | 2008/0133627 A1 | 6/2008 | Langhammer et al. |
| 6,774,669 B1 | 8/2004 | Liu et al. | | 2008/0183783 A1 | 7/2008 | Tubbs |
| 6,781,408 B1 | 8/2004 | Langhammer | | 2009/0172052 A1 | 7/2009 | DeLaquil et al. |
| 6,781,410 B2 | 8/2004 | Pani et al. | | 2009/0187615 A1 | 7/2009 | Abe et al. |
| 6,788,104 B2 | 9/2004 | Singh et al. | | 2009/0300088 A1 | 12/2009 | Michaels et al. |
| 6,801,924 B1 | 10/2004 | Green et al. | | 2010/0098189 A1 | 4/2010 | Oketani |
| 6,801,925 B2 | 10/2004 | Pether et al. | | | | |
| 6,836,839 B2 | 12/2004 | Master et al. | | FOREIGN PATENT DOCUMENTS | | |
| 6,874,079 B2 | 3/2005 | Hogenauer | | EP | 0 411 491 | 2/1991 |
| 6,889,238 B2 | 5/2005 | Johnson | | EP | 0 461 798 | 12/1991 |
| 6,904,471 B2 | 6/2005 | Boggs et al. | | EP | 0 498 066 | 8/1992 |
| 6,924,663 B2 | 8/2005 | Masui et al. | | EP | 0 555 092 | 8/1993 |
| 6,963,890 B2 | 11/2005 | Dutta et al. | | EP | 0 606 653 | 7/1994 |

| | | |
|---|---|---|
| EP | 0 657 803 | 6/1995 |
| EP | 0 660 227 | 6/1995 |
| EP | 0 668 659 | 8/1995 |
| EP | 0 721 159 | 7/1996 |
| EP | 0 905 906 | 3/1999 |
| EP | 0 909 028 | 4/1999 |
| EP | 0 927 393 | 7/1999 |
| EP | 0 992 885 | 4/2000 |
| EP | 1 031 934 | 8/2000 |
| EP | 1 058 185 | 12/2000 |
| EP | 1 220 108 | 7/2002 |
| GB | 2 283 602 | 5/1995 |
| GB | 2 286 737 | 8/1995 |
| GB | 2 318 198 | 4/1998 |
| JP | 61-237133 | 10/1986 |
| JP | 63-216131 | 8/1988 |
| JP | 4-332036 | 11/1992 |
| JP | 5-134851 | 6/1993 |
| JP | 06-187129 | 7/1994 |
| JP | 7-135447 | 5/1995 |
| JP | 11-296345 | 10/1999 |
| JP | 2000-259394 | 9/2000 |
| JP | 2002-108606 | 4/2002 |
| JP | 2002-251281 | 9/2002 |
| WO | WO95/27243 | 10/1995 |
| WO | WO96/28774 | 9/1996 |
| WO | WO97/08606 | 3/1997 |
| WO | WO98/12629 | 3/1998 |
| WO | WO98/32071 | 7/1998 |
| WO | WO98/38741 | 9/1998 |
| WO | WO99/22292 | 5/1999 |
| WO | WO99/31574 | 6/1999 |
| WO | WO99/56394 | 11/1999 |
| WO | WO00/51239 | 8/2000 |
| WO | WO00/52824 | 9/2000 |
| WO | WO01/13562 | 2/2001 |
| WO | WO 2005/066832 | 7/2005 |
| WO | WO2005/101190 | 10/2005 |

OTHER PUBLICATIONS

Florent De Dinechin, Bogdan Pasca; "Large multipliers with less DSP blocks," available online Jan. 2009, retrieved from http://hal-ens-lyon.archives-ouvertes.fr/ensl-00356421/en/.*

Altera Corporation, "Advanced Synthesis Cookbook", Document Version 3.0, May 2008.*

Zhou, G; Michalik, H.; Hinsenkamp, L.; "Efficient and High-Throughput Implementations of AES-GCM on FPGAs," International Conference on Field-Programmable Technology, Dec. 2007.*

Wajih, E.-H.Y.; Mohsen, M.; Medien, Z.; Belgacem, B.; "Efficient hardware architecture of recursive Karatsuba-Ofman multiplier," 3rd International Conference on Design and Technology of Integrated Systems in Nanoscale Era, Mar. 2008.*

Nadia Nedjah and Luiza de Macedo Mourelle, "Fast Less Recursive Hardware for Large Number Multiplication Using Karatsuba-Ofman's Algorithm," Computer and Information Sciences—ISCIS 2003, pp. 43-50.*

Altera Corporation, "FIR Compiler: MegaCore® Function User Guide," version 3.3.0, rev. 1, pp. 3 11 through 3 15 (Oct. 2005).

Govindu, G. et al., "A Library of Parameterizable Floating-Point Cores for FPGAs and Their Application to Scientific Computing," *Proc Int'l Conf. Eng. Reconfigurable Systems and Algorithms (ERSA'05)*, Jun. 2005.

Govindu, G. et al., "Analysis of High-performance Floating-point Arithmetic on FPGAs," *Proceedings of the 18th International Parallel and Distributed Processing Symposium (PDPS'04)*, pp. 149-156, Apr. 2004.

Nakasato, N., et al., "Acceleration of Hydrosynamical Simulations using a FPGA board" *The Institute of Electronics Information and Communication Technical Report CPSY2005-47*, vol. 105, No. 515, Jan. 17, 2006.

Osana, Y., et al., "Hardware-resource Utilization Analysis on an FPGA-Based Biochemical Simulator ReCSiP", *The Institute of Electronics Information and Communication Technical Report CPSY2005-63*, vol. 105, No. 516, Jan. 18, 2006.

Vladimirova, T. et al., "Floating-Point Mathematical Co-Processor for a Single-Chip On-Board Computer," *MAPLD'03 Conference, D5*, Sep. 2003.

Altera Corporation, "DSP Blocks in Stratix II and Stratix II GX Devices," *Stratix II Device Handbook*, vol. 2, Chapter 6, v4.0 (Oct. 2005).

Underwood, K. "FPGAs vs. CPUs: Trends in Peak Floating-Point Performance," *Proceedings of the 2004 ACM/SIGDA 12th International Symposium on Field Programmable Gate Arrays*, pp. 171-180, Feb. 22-24, 2004.

Xilinx Inc., "XtremeDSP Design Considerations User Guide," v 1.2, Feb. 4, 2005.

Amos, D., "PLD architectures match DSP algorithms," *Electronic Product Design*, vol. 17, No. 7, Jul. 1996, pp. 30, 32.

Analog Devices, Inc., The Applications Engineering Staff of Analog Devices, DSP Division, *Digital Signal Processing Applications Using the ADSP-2100 Family* (edited by Amy Mar), 1990, pp. 141-192).

Andrejas, J., et al., "Reusable DSP functions in FPGAs," *Field-Programmable Logic and Applications. Roadmap to Reconfiourable Computing. 10th International Conference, FPL 2000. Proceedings (Lecture Notes in Computer Science vol. 1896)*, Aug. 27-30, 2000, pp. 456-461.

Aoki, T., "Signed-weight arithmetic and its application to a field-programmable digital filter architecture," *IEICE Transactions on Electronics*, 1999, vol. E82C, No. 9, Sep. 1999, pp. 1687-1698.

Ashour, M.A., et al., "An FPGA implementation guide for some different types of serial-parallel multiplier-structures," *Microelectronics Journal*, vol. 31, No. 3, 2000, pp. 161-168.

Berg. B.L., et al."Designing Power and Area Efficient Multistage FIR Decimators with Economical Low Order Filters," *ChipCenter Technical Note*, Dec. 2001.

Bursky, D., "Programmable Logic Challenges Traditional ASIC SoC Designs", *Electronic Design*, Apr. 15, 2002.

Chhabra, A. et al., Texas Instruments Inc., "A Block Floating Point Implementation on the TMS320C54x DSP", Application Report SPRA610, Dec. 1999, pp. 1-10.

Colet, p., "When DSPs and FPGAs meet: Optimizing image processing architectures," *Advanced Imaging*, vol. 12, No. 9, Sep. 1997, pp. 14, 16, 18.

Crookes, D., et al., "Design and implementation of a high level programming environment for FPGA-based image processing," *IEE Proceedings-Vision, Image and Signal Processing*, vol. 147, No. 4, Aug. 2000, pp. 377-384.

Debowski, L., et al., "A new flexible architecture of digital control systems based on DSP and complex CPLD technology for power conversion applications," *PICM 2000: Europe Official Proceedings of the Thirty-Seventh International Intelligent Motion Conference*, Jun. 6-8, 2000, pp. 281-286.

Dick, C., et al., "Configurable logic for digital communications: some signal processing perspectives," *IEEE Communications Magazine*, vol. 37, No. 8, Aug. 1999, pp. 107-111.

Do, T.-T., et al., "A flexible implementation of high-performance FIR filters on Xilinx FPGAs," *Field-Programmable Logic and Applications: From FPGAs to Computing Paradigm. 8th International Workshop, FPL'98. Proceedings*, Hartenstein, R.W., et al., eds., Aug. 31-Sep. 3, 1998, pp. 441-445.

Gaffer, A.A., et al., "Floating-Point Bitwidth Analysis via Automatic Differentiation," *IEEE Conference on Field Programmable Technology*, Hong Kong, Dec. 2002.

Guccione, S.A.,"Run-time Reconfiguration at Xilinx," *Parallel and distributed processing: 15 IPDPS 2000 workshops*, Rolim, J., ed., May 1-5, 2000, p. 873.

Hauck, S., "The Future of Reconfigurable Systems," *Keynote Address, 5th Canadian Conference on Field Programmable Devices*, Jun. 1998, http://www.ee.washington.edu/people/faculty/hauck/publications/ReconfigFuture.PDF.

Heysters, P.M., et al., "Mapping of DSP algorithms on field programmable function arrays," *Field-Programmable Logic and Applications. Roadmap to Reconfigurable Computing. 10th International Conference, FPL 2000. Proceedings (Lecture Notes in Computer Science* vol. 1896), Aug. 27-30, 2000, pp. 400-411.

Huang, J., et al., "Simulated Performance of 1000BASE-T Receiver with Different Analog Front End Designs," *Proceedings of the 35th Asilomar Conference on Signals, Systems, and Computers*, Nov. 4-7, 2001.

Lattice Semiconductor Corp, ORCA® FPGA Express™ *Interface Manual: ispLEVER® Version 3.0*, 2002.

Lucent Technologies, Microelectronics Group,"Implementing and Optimizing Multipliers in ORCA™ FPGAs,", Application Note. AP97-008FGPA, Feb. 1997.

"Implementing Multipliers in FLEX 10K EABs", *Altera*, Mar. 1996.

"Implementing Logic with the Embedded Array in FLEX 10K Devices", *Altera*, May 2001, ver. 2.1.

Jinghua Li, "Design a pocket multi-bit multiplier in FPGA," *1996 2nd International Conference on ASIC Proceedings (IEEE Cat. No. 96TH8140)*, Oct. 21-24, 1996, pp. 275-279.

Jones, G., "Field-programmable digital signal conditioning," *Electronic Product Design*, vol. 21, No. 6, Jun. 2000, pp. C36-C38.

Kiefer, R., et al., "Performance comparison of software/FPGA hardware partitions for a DSP application," *14th Australian Microelectronics Conference. Microelectronics: Technology Today for the Future. MICRO '97 Proceedings*, Sep. 28-Oct. 1, 1997, pp. 88-93.

Kramberger, I., "DSP acceleration using a reconfigurable FPGA," *ISIE '99. Proceedings of the IEEE International Symposium on Industrial Electronics* (Cat. No. 99TH8465), vol. 3 , Jul. 12-16, 1999, pp. 1522-1525.

Langhammer, M., "How to implement DSP in programmable logic," *Elettronica Oggi*, No. 266 , Dec. 1998, pp. 113-115.

Langhammer, M., "Implementing a DSP in Programmable Logic," *Online EE Times*, May 1998, http://www.eetimes.com/editorial/1998/coverstory9805.html.

Lazaravich, B.V., "Function block oriented field programmable logic arrays," *Motorola, Inc. Technical Developments*, vol. 18, Mar. 1993, pp. 10-11.

Lund, D., et al., "A new development system for reconfigurable digital signal processing," First International Conference on 3G Mobile Communication Technologies (Conf. Publ. No. 471), Mar. 27-29, 2000, pp. 306-310.

Miller, N.L., et al., "Reconfigurable integrated circuit for high performance computer arithmetic," *Proceedings of the 1998 IEE Colloquium on Evolvable Hardware Systems (Digest)*, No. 233, 1998, pp. 2/1-2/4.

Mintzer, L., "Xilinx FPGA as an FFT processor," *Electronic Engineering*, vol. 69, No. 845, May 1997, pp. 81, 82, 84.

Faura et al., "A Novel Mixed Signal Programmable Device With On-Chip Microprocessor," Custom Integrated Circuits Conference, 1997. Proceedings of the IEEE 1997 Santa Clara, CA, USA, May 5, 1997, pp. 103-106.

Nozal, L., et al., "A new vision system: programmable logic devices and digital signal processor architecture (PLD+DSP)," *Proceedings IECON '91. 1991 International Conference on Industrial Electronics, Control and Instrumentation* (Cat. No. 91CH2976-9), vol. 3, Oct. 28-Nov. 1, 1991, pp. 2014-2018.

Papenfuss, J.R, et al., "Implementation of a real-time, frequency selective, RF channel simulator using a hybrid DSP-FPGA architecture," *RAWCON 2000: 2000 IEEE Radio and Wireless Conference* (Cat. No. 00EX404), Sep. 10-13, 2000, pp. 135-138.

Parhami, B., "Configurable arithmetic arrays with data-driven control," *34th Asilomar Conference on Signals, Systems and Computers*, vol. 1, 2000, pp. 89-93.

"The QuickDSP Design Guide", Quicklogic, Aug. 2001, revision B.

"QuickDSP™ Family Data Sheet", *Quicklogic*, Aug. 7, 2001, revision B.

Rangasayee, K., "Complex PLDs let you produce efficient arithmetic designs," *EDN (European Edition)*, vol. 41, No. 13, Jun. 20, 1996, pp. 109, 110, 112, 114, 116.

Rosado, A., et al., "A high-speed multiplier coprocessor unit based on FPGA," *Journal of Electrical Engineering*, vol. 48, No. 11-12, 1997, pp. 298-302.

Santillan-Q., G.F., et al., "Real-time integer convolution implemented using systolic arrays and a digit-serial architecture in complex programmable logic devices," *Proceedings of the Third International Workshop on Design of Mixed-Mode Integrated Circuits and Applications* (Cat. No. 99EX303), Jul. 26-28, 1999, pp. 147-150.

Texas Instruments Inc., "TMS320C54x DSP Reference Set, vol. 1: CPU and Peripherals", Literature No. SPRU131F, Apr. 1999, pp. 2-1 through 2-16 and 4-1 through 4-29.

Tisserand, A., et al., "An on-line arithmetic based FPGA for low power custom computing," *Field Programmable Logic and Applications, 9th International Workshop, FPL'99, Proceedings (Lecture Notes in Computer Science* vol. 1673), Lysaght, P., et al., eds., Aug. 30-Sep. 1, 1999, pp. 264-273.

Tralka, C., "Symbiosis of DSP and PLD," *Elektronik*, vol. 49, No. 14 , Jul. 11, 2000, pp. 84-96.

Valls, J., et al., "A Study About FPGA-Based Digital Filters," *Signal Processing Systems, 1998*, SIPS 98, 1998 IEEE Workshop, Oct. 10, 1998, pp. 192-201.

"Virtex-II 1.5V Field-Programmable Gate Arrays",*Xilinx*, Jan. 25, 2001, module 2 of 4.

"Virtex-II 1.5V Field-Programmable Gate Arrays", *Xilinx*, Apr. 2, 2001, module 1 of 4.

"Virtex-II 1.5V Field-Programmable Gate Arrays", *Xilinx*, Apr. 2, 2001, module 2 of 4.

Walters, A.L., "A Scaleable FIR Filter Implementation Using 32-bit Floating-Point Complex Arithmetic on ,a FPGA Based Custom Computing Platform," Allison L. Walters, Thesis Submitted to the Faculty of Virginia Polytechnic Institute and State University, Jan. 30, 1998.

Weisstein, E.W., "Karatsuba Multiplication," *MathWorld—A Wolfram Web Resource* (Dec. 9, 2007), accessed Dec. 11, 2007 at http://mathworld.wolfram.com/KaratsubaMultiplication.html.

Wenzel, L., "Field programmable gate arrays (FPGAs) to replace digital signal processor integrated circuits," *Elektronik* , vol. 49, No. 5, Mar. 7, 2000, pp. 78-86.

"Xilinx Unveils New FPGA Architecture to Enable High-Performance, 10 Million System Gate Designs", *Xilinx*, Jun. 22, 2000.

"Xilinx Announces DSP Algorithms, Tools and Features for Virtex-II Architecture", *Xilinx*, Nov. 21, 2000.

Xilinx Inc., "Virtex-II 1.5V Field-Programmable Gate Arrays", Advance Product Specification, DS031-2 (v1.9), Nov. 29, 2001, Module 2 of 4, pp. 1-39.

Xilinx Inc., "Using Embedded Multipliers", Virtex-II Platform FPGA Handbook, UG002 (v1.3), Dec. 3, 2001, pp. 251-257.

Xilinx, Inc., "A 1D Systolic FIR," copyright 1994-2002, downloaded from http://www.iro.umontreal.ca/~aboulham/F6221/Xilinx%20A%201D%20systolic%20FIR.htm.

Xilinx, Inc., "The Future of FPGA's," White Paper, available Nov. 14, 2005 for download from http://www.xilinx.com/prs_rls,5yrwhite.htm.

Haynes, S.D., et al., "Configurable multiplier blocks for embedding in FPGAs," *Electronics Letters*, vol. 34, No. 7, pp. 638-639 (Apr. 2, 1998).

Kim, Y., et al., "Fast GPU Implementation for the Solution of Tridiagonal Matrix Systems," *Journal of Korean Institute of Information Scientists and Engineers*, vol. 32, No. 12, pp. 692-704, Dec. 2005.

Altera Corporation, "Digital Signal Processing (DSP)," *Stratix Device Handbook*, vol. 2, Chapter 6 and Chapter 7, v1.1 (Sep. 2004).

Altera Corporation, "Stratix II Device Handbook, Chapter 6—DSP Blocks in Stratix II Devices," v1.1, Jul. 2004.

Xilinx Inc., "Complex Multiplier v2.0", DS291 Product Specification/Datasheet, Nov. 2004.

\* cited by examiner

IMPLEMENTING MULTIPLIERS IN A PROGRAMMABLE INTEGRATED CIRCUIT DEVICE

BACKGROUND OF THE INVENTION

This invention relates to multiplication operations in programmable integrated circuit devices such as, e.g., programmable logic devices (PLDs).

As applications for which PLDs are used increase in complexity, it has become more common to design PLDs to include specialized processing blocks in addition to blocks of generic programmable logic resources. Such specialized processing blocks may include a concentration of circuitry on a PLD that has been partly or fully hardwired to perform one or more specific tasks, such as a logical or a mathematical operation. A specialized processing block may also contain one or more specialized structures, such as an array of configurable memory elements. Examples of structures that are commonly implemented in such specialized processing blocks include: multipliers, arithmetic logic units (ALUs), barrel-shifters, various memory elements (such as FIFO/LIFO/SIPO/RAM/ROM/CAM blocks and register files), AND/NAND/OR/NOR arrays, etc., or combinations thereof.

One particularly useful type of specialized processing block that has been provided on PLDs is a digital signal processing (DSP) block, which may be used to process, e.g., audio signals. Such blocks are frequently also referred to as multiply-accumulate ("MAC") blocks, because they include structures to perform multiplication operations, and sums and/or accumulations of multiplication operations.

For example, some PLDs sold by Altera Corporation, of San Jose, Calif., as part of the STRATIX® family, include DSP blocks, each of which may include four 18-bit-by-18-bit multipliers. Each of those DSP blocks also may include adders and registers, as well as programmable connectors (e.g., multiplexers) that allow the various components to be configured in different ways. In each such block, the multipliers can be configured not only as four individual 18-bit-by-18-bit multipliers, but also as four smaller multipliers, or as one larger (36-bit-by-36-bit) multiplier. In addition, one 18-bit-by-18-bit complex multiplication (which decomposes into two 18-bit-by-18-bit multiplication operations for each of the real and imaginary parts) can be performed. Larger multiplications can be performed by using more of the 18-bit-by-18-bit multipliers—e.g., from other DSP blocks.

SUMMARY OF THE INVENTION

The present invention reduces the number of multipliers of a particular size that are required to perform a multiplication larger than that size. In the example of a 36-bit-by-36-bit multiplication, the number of 18-bit-by-18-bit multipliers required may be reduced from four to three. This may be achieved by using recursive decomposition techniques. As discussed in more detail below, if for each of two 36 bit numbers, the "digits" of each respective 36-bit number are added together, and then the two sums are multiplied, the resulting term can be combined additively with the product of the least-significant bits of the two 36-bit numbers and the product of the most-significant bits of the two 36-bit numbers to provide the desired product.

In such an implementation, while fewer multipliers are required, additional adders may be required. In addition, in at least one embodiment, at least one of the multipliers may be required to handle an additional bit in each input; thus, in the 36-bit-by-36-bit example given above, at least one of the multiplications may be a 19-bit-by-19-bit multiplication. A larger multiplier may be provided to handle this multiplication, or an "extension" of an 18-bit-by-18-bit multiplication may be provided by appropriately configuring available programmable logic.

Therefore, in accordance with the present invention, there is provided a method of configuring a programmable integrated circuit device to perform a multiplication operation on a number of multiplicand input values each having a first plurality of bits, where the programmable integrated circuit device incorporates multiplier circuits for multiplicand input values each having a second plurality of bits. The method includes configuring logic of the programmable integrated circuit device to break up each of the multiplicand input values into a plurality of segments, each segment having the second plurality of bits, where a first one of the segments of one of the multiplicand input values is of greater significance than a second one of the segments of that one of the multiplicand input values, with the second one of the segments being of lesser significance. Logic of the programmable integrated circuit device may be configured for adding together, for each of the multiplicand input values, the segments of greater significance and lesser significance, to create a respective sum for each of the multiplicand values. Logic of the programmable integrated circuit device is configured for multiplying together those segments of greater significance using a first one of the multiplier circuits, multiplying together those segments of lesser significance using a second one of the multiplier circuits, and multiplying together the sums using a third one of the multiplier circuits. Logic of the programmable integrated circuit device also may be configured to shift outputs of the first and second ones of the multiplier circuits by respective amounts and to combine outputs of the first, second and third ones of the multiplier circuits according to a recursive decomposition of the multiplication operation.

A programmable logic device so configurable, and so configured, and a machine-readable data storage medium encoded with software for performing the method, are also provided.

BRIEF DESCRIPTION OF THE DRAWINGS

Further features of the invention, its nature and various advantages, will be apparent upon consideration of the following detailed description, taken in conjunction with the accompanying drawings, in which like reference characters refer to like parts throughout, and in which.

DETAILED DESCRIPTION OF THE INVENTION

When a 36-bit-by-36-bit multiplication is implemented in 18-bit-by-18-bit multipliers using a linear decomposition, each of the two 36-bit operands a and b can be expressed as a set of two 18-bit numbers $a_1:a_0$ and $b_1:b_0$, so that their product M can be represented as follows:

$$M=(2^x a_1+a_0)*(2^x b_1+b_0)$$

The power-of-2 factors represent left-shifting by a number of places equal to the exponent. Expanding, the 36-bit-by-36-bit multiplication M is:

$$M=2^{2x}a_1 b_1+2^x(a_1 b_0+a_0 b_1)+a_0 b_0$$

There are four unique terms $a_n b_m$, so four multipliers are required.

Instead, however, in a recursive decomposition, such as the "Karatsuba multiplication" described, e.g., in Weisstein, E. W., "Karatsuba Multiplication," *MathWorld—A Wolfram Web Resource*, http://mathworld.wolfram.com/KaratsubaMultiplication.html, the 18-bit components $a_n$, $b_m$ can be combined as follows:

$$A=(a_1+a_0)*(b_1+b_0)=a_1 b_1+a_1 b_0+a_0 b_1+a_0 b_0$$

Substituting A into the linear decomposition:

$$M=2^{2x}a_1 b_1+2^x(A-a_1 b_1+a_0 b_0)+a_0 b_0$$

In this formulation of the computation, there is a total of five terms, but only three unique terms A and $a_n b_n$ (n=0,1). By comparison, the linear decomposition includes four unique terms $a_n b_m$ (n=0,1; m=0,1), constituting four total terms. Therefore it is possible to trade off a multiplier (specific and expensive) for adders (more general-purpose and inexpensive).

The term A is a product of two terms $(a_1+a_0)$ and $(b_1+b_0)$, each of which is the sum of two 18-bit numbers and therefore may be 19-bits wide. Thus, computing A may require provision of a 19-by-19 multiplier, or the 19-by-19 multiplication may be performed by "extending" an 18-by-18 multiplier using programmable logic resources, as described in copending, commonly-assigned U.S. patent application Ser. No. 12/034,146, filed Feb. 20, 2008 and hereby incorporated by reference herein in its entirety.

The invention will now be described with reference to FIGS. 1-7.

Figure 1:
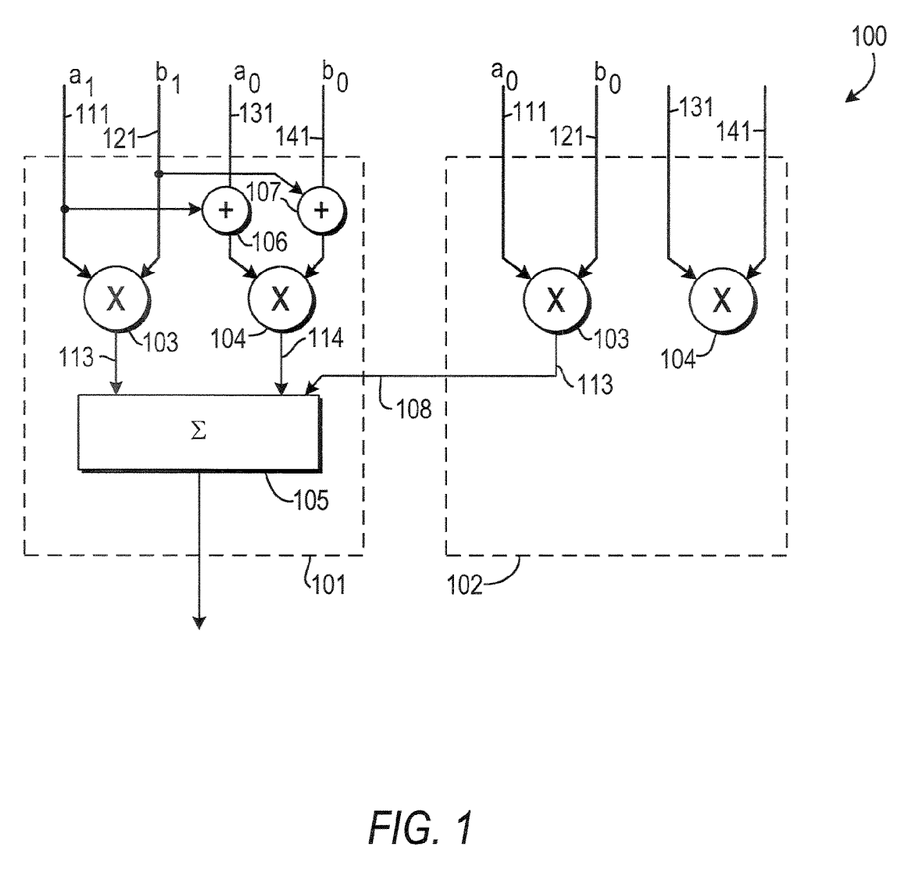
FIG. 1 is a diagram of the logic flow, and a circuit configuration with which a programmable device may be programmed, for performing multiplication in accordance with an embodiment of the invention.

FIG. 1 is a diagram 100 of both the logic flow, and a circuit configuration with which a programmable device may be programmed, for multiplying a first number a by second number b. Each number a and b may be a 36-bit number, or a smaller number such as a 32-bit number. Specialized processing blocks 101, 102 may be row-redundant DSP blocks—i.e., DSP blocks designed to fit in the same space in the device floorplan as a unit of programmable logic such as, in devices from Altera Corporation, a "logic array block"—of the type described, e.g., in copending, commonly-assigned U.S. patent application Ser. Nos. 12/249,051, filed Oct. 10, 2008, 12/380,853, filed concurrently herewith, and 12/380,841, filed concurrently herewith, each of which is hereby incorporated by reference herein in its respective entirety.

As described in the aforementioned incorporated applications, each block 101, 102 has conductors that allow it to communicate with each neighboring block 101, 102 to the right or to the left. Each block 101, 102 has two partial multipliers 103, 104, each of which may include a partial-product generator and a compressor, to provide redundant partial multiplication vectors 113, 114 that may be combined in combinatorial circuitry 105, which is described in more detail below.

In accordance with an embodiment of the invention, each specialized processing block 101, 102 may be provided with input adders 106, 107 (shown only in block 101) that allow addition of various ones of inputs 111, 121, 131, 141 prior to multiplication. In this embodiment, inputs 111, 131 and inputs 121, 141 may be added together. In addition, conductor 108 may be provided between blocks 101, 102, allowing partial multiplication vector 113 of block 102 to be combined with partial multiplication vectors 113, 114 of block 101 in combinatorial circuitry 105 of block 101. In this way, partial multiplier 103 of block 102 may be "borrowed" or "stolen" as a "third multiplier" for block 101.

If, as shown in FIG. 1, the most-significant group of bits $a_1$, $b_1$ of a and b is input via inputs 111, 121 of block 101 to partial multiplier 103 of block 101 and to input adders 106, 107 of block 101, and the least-significant group of bits $a_0$, $b_0$ of a and b is input via inputs 131, 141 of block 101 to partial multiplier 103 of block 101 and to input adders 106, 107 of block 101, and via inputs 111, 121 of block 102 to partial multiplier 103 of block 102, then partial multiplier 103 of block 101 computes the $a_1 b_1$ term to be used in computing M, and partial multiplier 103 of block 102 computes the $a_0 b_0$ term to be used in computing M, while partial multiplier 104 of block 102 computes the A term to be used in computing M.

Figure 2:
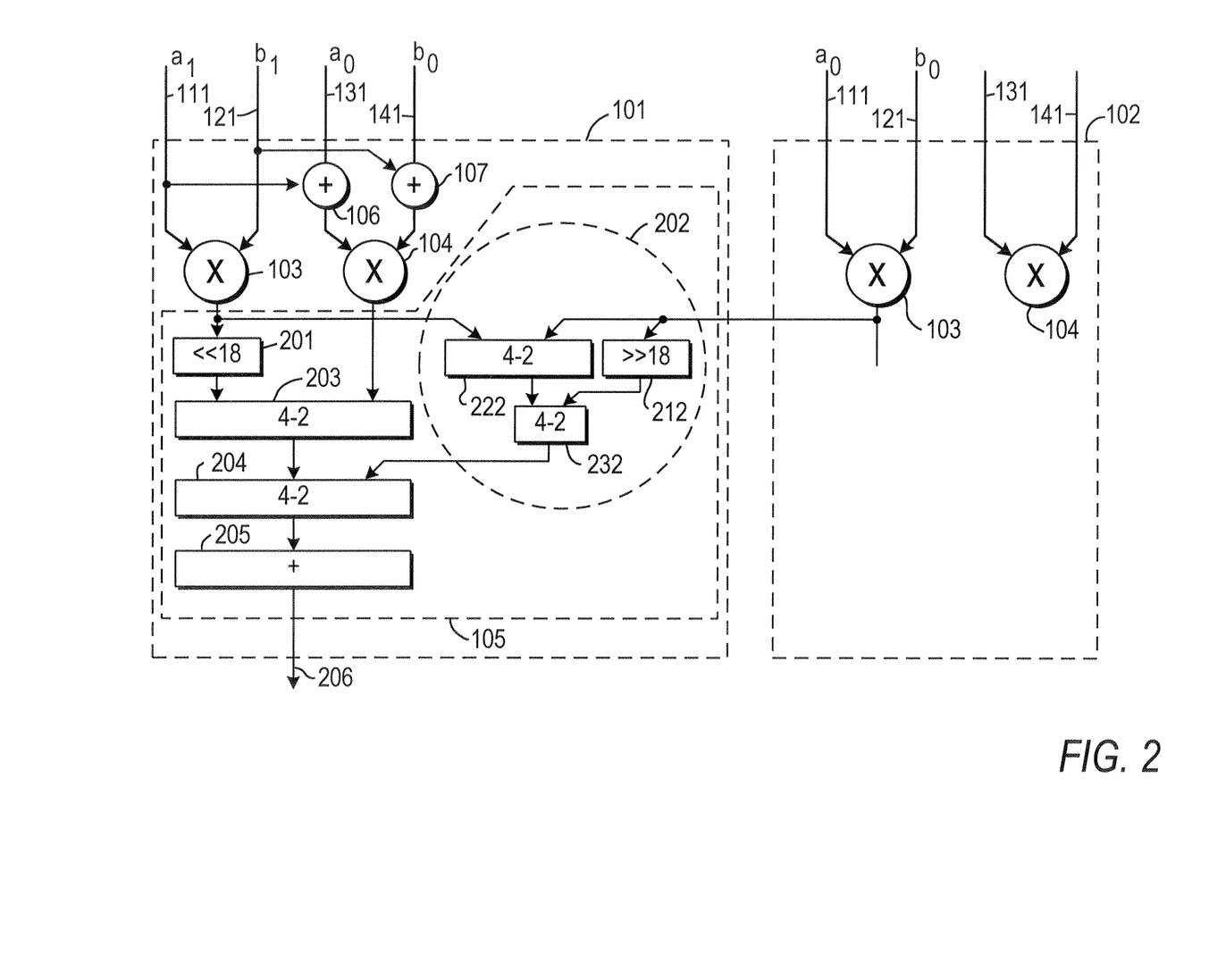
FIG. 2 is a more detailed representation of the logic flow, and a circuit configuration with which a programmable device may be programmed, for performing multiplication in accordance with an embodiment of the invention.

As seen in FIG. 2, the result M is then $a_1 b_1$ shifted left 18 places, plus $(A-a_1 b_1-a_0 b_0)$, plus $a_0 b_0$ shifted right 18 places, which generates a 54-bit result out of the block 101 (the lower 18 bits of $a_0 b_0$ may be truncated insofar as they do not contribute to the required precision).

The 18 bit left shift for $a_1 b_1$ may be performed by shifter 201 in block 101. Additional arithmetic logic 202 may be added to the specialized processing block described in the above-incorporated applications to perform the $-a_1 b_1-a_0 b_0+(a_0 b_0 \gg 18)$ portion of the calculation. Arithmetic logic 202 may be implemented with right shifter 212 and two 4-2 compressors—one 37-bit 4-2 compressor 222 for $-a_1 b_1-a_0 b_0$, and one shorter 19-bit 4-2 compressor 232 to add $(a_0 b_0 \gg 18)$. A multiplexer (not shown) may be added before arithmetic circuitry 202, to select between that new arithmetic circuitry or the existing connections from the adjacent block 102.

Although these changes have been described in connection with block 101, there is likely to be an entire row of blocks 101, 102, and any one of them may play the role of block 101 or of block 102. Thus, additional arithmetic logic 202 may be added to each specialized processing block 101, 102.

The output vectors of partial multiplier 104 and left-shifter 201 may be compressed by 57-bit 4-2 compressor 203. The carry-save vectors output by 4-2 compressor 203 and 4-2 compressor 232 may be further compressed by 57-bit 4-2 compressor 204. The carry-save vectors output by 4-2 compressor 204 may be input to carry-propagate adder 205 to provide result 206 (M).

Figure 3:
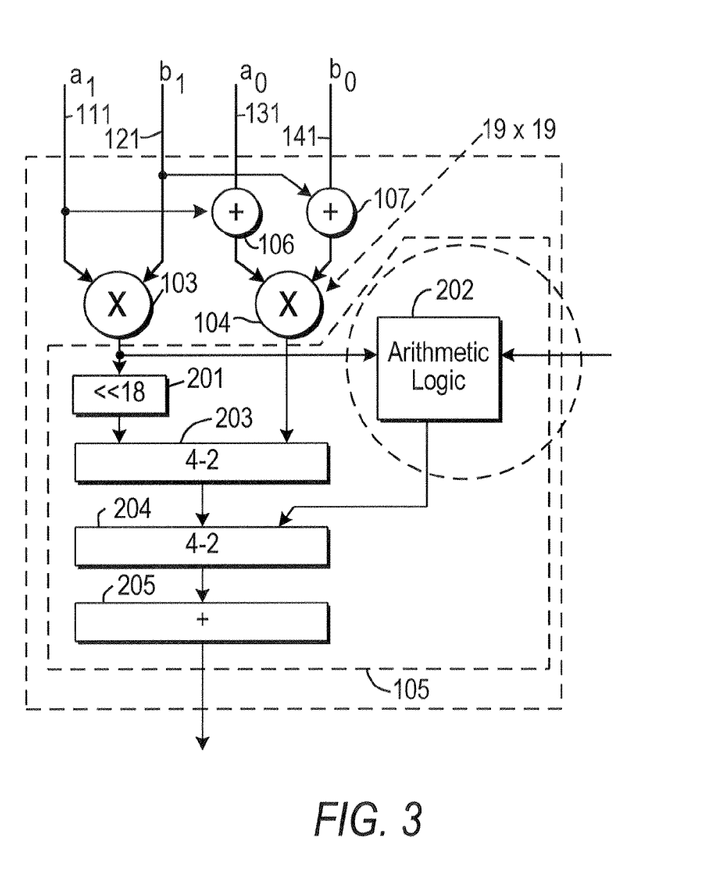
FIG. 3 is a representation of the logic flow, and a circuit configuration with which a programmable device may be programmed, for performing multiplication in accordance with a first variant of the embodiment of FIG. 2.
Figure 4:
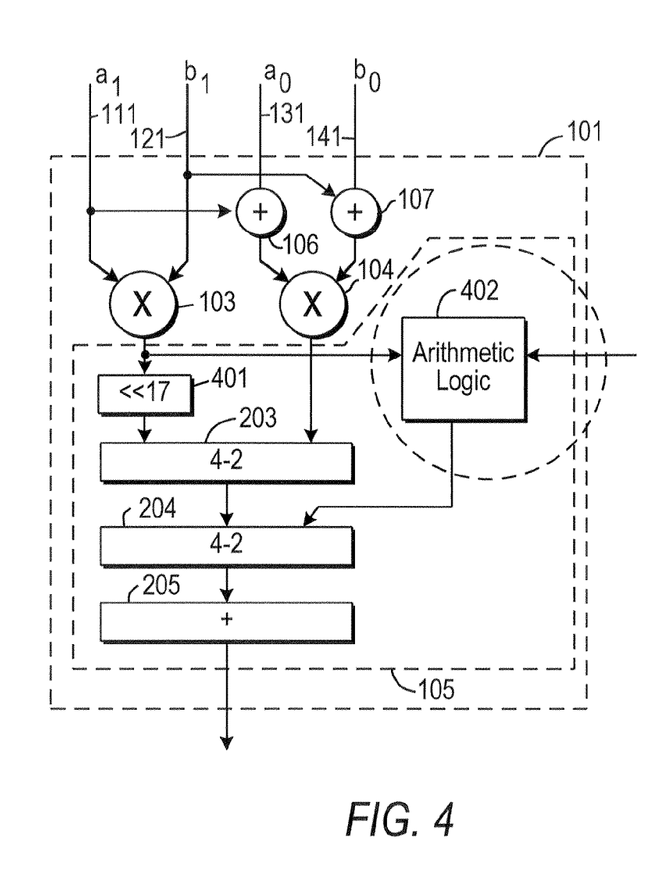
FIG. 4 is a representation of the logic flow, and a circuit configuration with which a programmable device may be programmed, for performing multiplication in accordance with a second variant of the embodiment of FIG. 2.

Slight variations of this basic arrangement may be necessary depending on the size of the multiplications to be performed. FIGS. 3 and 4 compare the implementations of 36-bit-by-36-bit multiplication and 32-bit-by-32-bit multiplication, respectively. In the 36-bit-by-36-bit case of FIG. 3, the outputs of adders 106, 107 may be 19 bits wide. Therefore, 18-bit-by-18-bit partial multiplier 104 may be replaced by 19-bit-by-19-bit partial multiplier 304 to accommodate this case. In the 32-bit-by-32-bit case of FIG. 4, the inputs can be limited to 17 bits, so that the adder outputs remain 18 bits wide. However, this may require changing 18-bit left shifter 201 to 17-bit left shifter 401, and changing 18-bit right shifter 212 to a 17-bit right shifter (not shown) in arithmetic logic 402.

Figure 5:
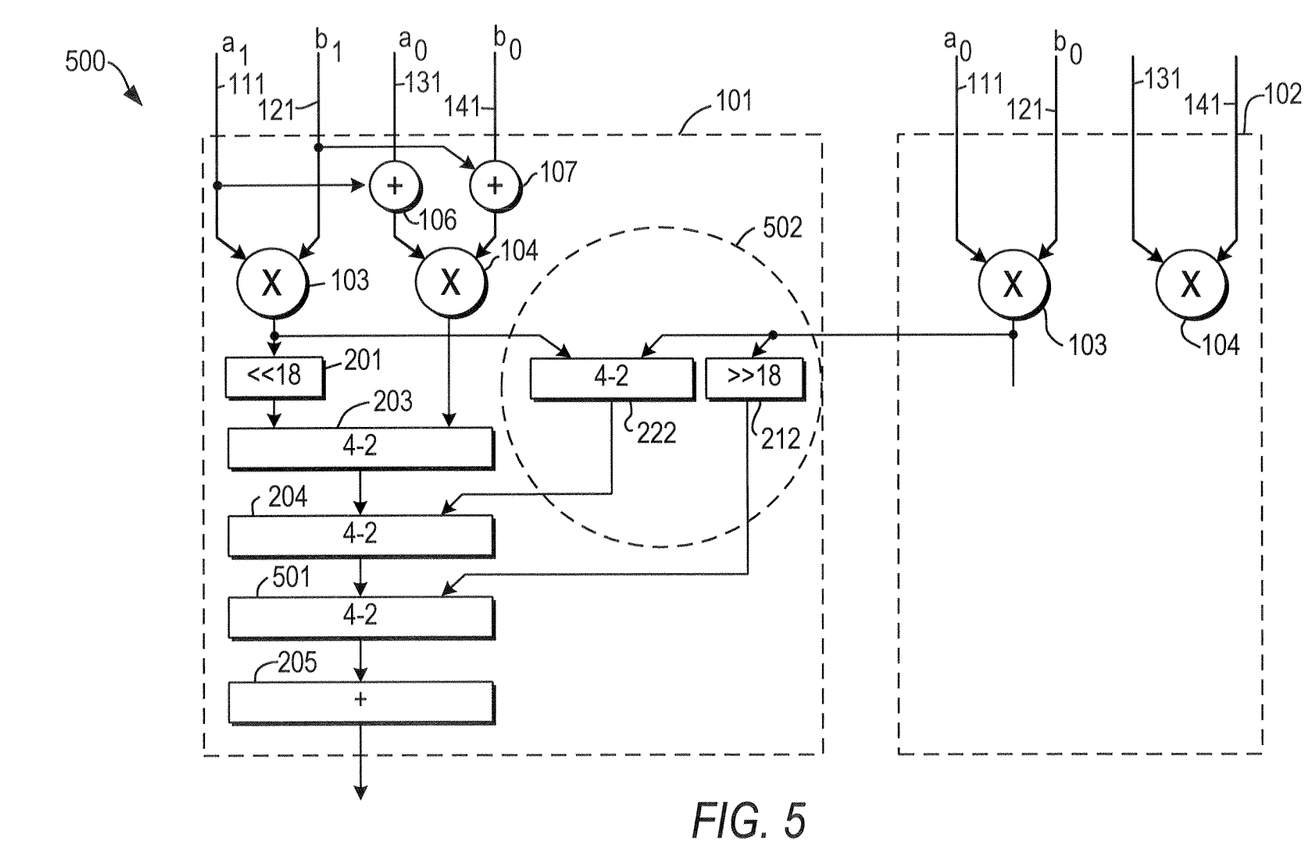
FIG. 5 is a representation of the logic flow, and a circuit configuration with which a programmable device may be programmed, for performing multiplication in accordance with an alternative to the embodiment of FIG. 2.

An alternative arrangement 500 to the basic arrangement shown in FIGS. 2-4 is shown in FIG. 5. Here, arithmetic logic 502 includes only shifter 212 and compressor 222, with the output of shifter 212, along with the output of compressor 204 may be further compressed by 4-2 compressor 501 before the final result is computed in carry-propagate adder 205.

Figure 6:
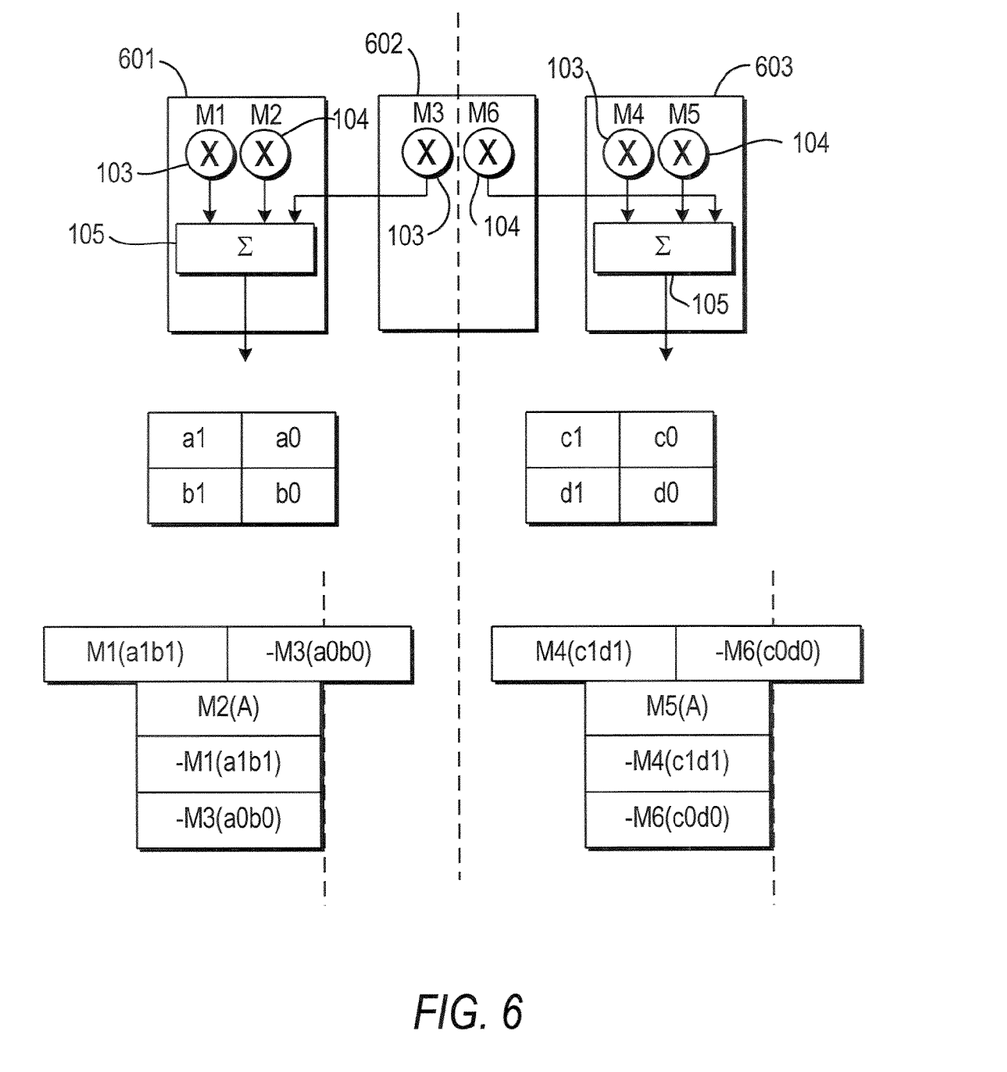
FIG. 6 is a schematic representation of the implementation of an embodiment of the invention in a device having a particular arrangement of specialized processing blocks.

Although the discussion heretofore has assumed that the $a_0b_0$ term would be computed in a specialized processing block 102 to the right of the block 101 that carried out the remainder of the calculation, in fact the bidirectional connection between blocks 101, 102 allows the $a_0b_0$ term to come from the left as well. A multiplexer 771 (see FIG. 7) would allow right shifter 212 to select either an input from the block to the right or an input from the block to the left. The result of this flexibility is illustrated in FIG. 6, where block 661 borrows one partial multiplier 103 from block 662 to its left, while block 663 borrows the other partial multiplier 104 from block 662 to its left. This bidirectional ability minimizes the waste of partial multipliers, assuring that a first partial multiplier need not be left unused simply because its companion partial multiplier in the same block has been borrowed by an adjacent block. Instead, the first partial multiplier also can be borrowed by a different adjacent block.

Figure 7:
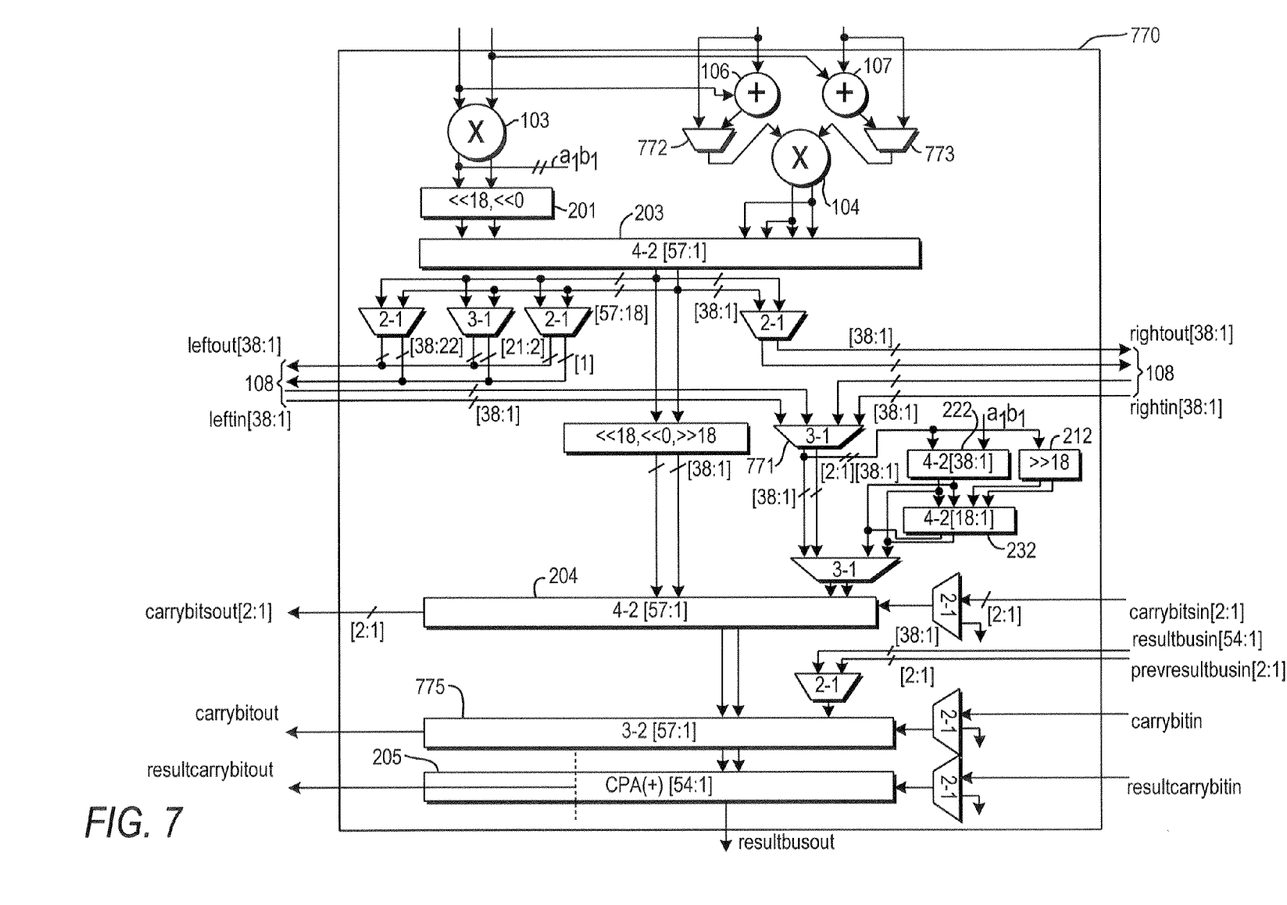
FIG. 7 is a schematic representation of the interior of one embodiment of a specialized processing block in which the invention may be implemented.

FIG. 7 shows the details of a specialized processing block 770, similar to those of the above-incorporated applications, but modified in accordance with the present invention as depicted in FIG. 2. Because block 770 may be part of a programmable device that may be configured in different ways, it includes connections, multiplexing options, carry-in/carry-out options, and bit-shifting options, that may not be directly relevant to the present invention. However, partial multipliers 103, 104, input adders 106, 107, shifter 201, arithmetic logic 202 (including compressors 222, 232 and shifter 212), compressors 203, 204, and carry-propagate adder 205 also are included, along with compressor 775, which may be used to carry out an accumulation function. Also seen in FIG. 7 are multiplexers 772, 773, for selectively bypassing input adders 106, 107 to carry out operations in which input adders 106, 107 are not used.

The discussion heretofore also has assumed that the complete result would be output by one specialized processing block, leading to truncation of the least-significant 18 bits. However, if the full 72 bits are required, the carry-propagate adder in the adjacent block can be used to output the lower 18 bits of the $a_0b_0$ term. This may require splitting the carry-propagate adder at some point, but that is known for calculating and outputting independent 18-bit-by-18-bit multiplier results.

The method of the invention configures a programmable integrated circuit device, such as a PLD, incorporating a modified specialized processing block as describe above, to create the structures shown in FIGS. 1-6 to perform multiplications of a certain size using a smaller number of multipliers than previous methods.

Instructions for carrying out the method according to this invention may be encoded on a machine-readable medium, to be executed by a suitable computer or similar device to implement the method of the invention for programming or configuring programmable integrated circuit devices to perform operations as described above. For example, a personal computer may be equipped with an interface to which a programmable integrated circuit device can be connected, and the personal computer can be used by a user to program the programmable integrated circuit device using a suitable software tool, such as the QUARTUS® II software available from Altera Corporation, of San Jose, Calif.

Figure 8:
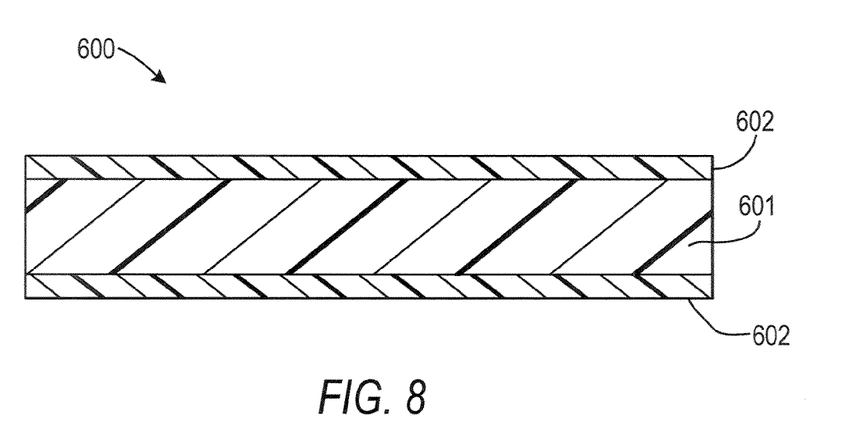
FIG. 8 is a cross-sectional view of a magnetic data storage medium encoded with a set of machine-executable instructions for performing the method according to the present invention.

FIG. 8 presents a cross section of a magnetic data storage medium 600 which can be encoded with a machine executable program that can be carried out by systems such as the aforementioned personal computer, or other computer or similar device. Medium 600 can be a floppy diskette or hard disk, or magnetic tape, having a suitable substrate 601, which may be conventional, and a suitable coating 602, which may be conventional, on one or both sides, containing magnetic domains (not visible) whose polarity or orientation can be altered magnetically. Except in the case where it is magnetic tape, medium 600 may also have an opening (not shown) for receiving the spindle of a disk drive or other data storage device.

The magnetic domains of coating 602 of medium 600 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

Figure 9:
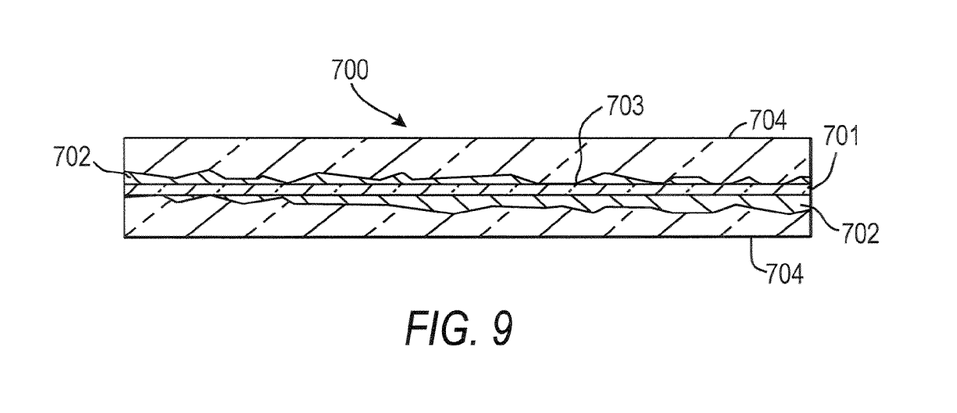
FIG. 9 is a cross-sectional view of an optically readable data storage medium encoded with a set of machine executable instructions for performing the method according to the present invention.

FIG. 9 shows a cross section of an optically-readable data storage medium 700 which also can be encoded with such a machine-executable program, which can be carried out by systems such as the aforementioned personal computer, or other computer or similar device. Medium 700 can be a conventional compact disk read only memory (CD-ROM) or digital video disk read only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 700 preferably has a suitable substrate 701, which may be conventional, and a suitable coating 702, which may be conventional, usually on one or both sides of substrate 701.

In the case of a CD-based or DVD-based medium, as is well known, coating 702 is reflective and is impressed with a plurality of pits 703, arranged on one or more layers, to encode the machine-executable program. The arrangement of pits is read by reflecting laser light off the surface of coating 702. A protective coating 704, which preferably is substantially transparent, is provided on top of coating 702.

In the case of magneto-optical disk, as is well known, coating 702 has no pits 703, but has a plurality of magnetic domains whose polarity or orientation can be changed magnetically when heated above a certain temperature, as by a laser (not shown). The orientation of the domains can be read by measuring the polarization of laser light reflected from coating 702. The arrangement of the domains encodes the program as described above.

Thus it is seen that a method for carrying out multiplications in a programmable integrated circuit device using fewer dedicated multiplier circuits, a programmable integrated circuit device programmed using the method, and software for carrying out the programming, have been provided.

A PLD 90 programmed according to the present invention may be used in many kinds of electronic devices. One possible use is in a data processing system 900 shown in FIG. 10. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

Figure 10:
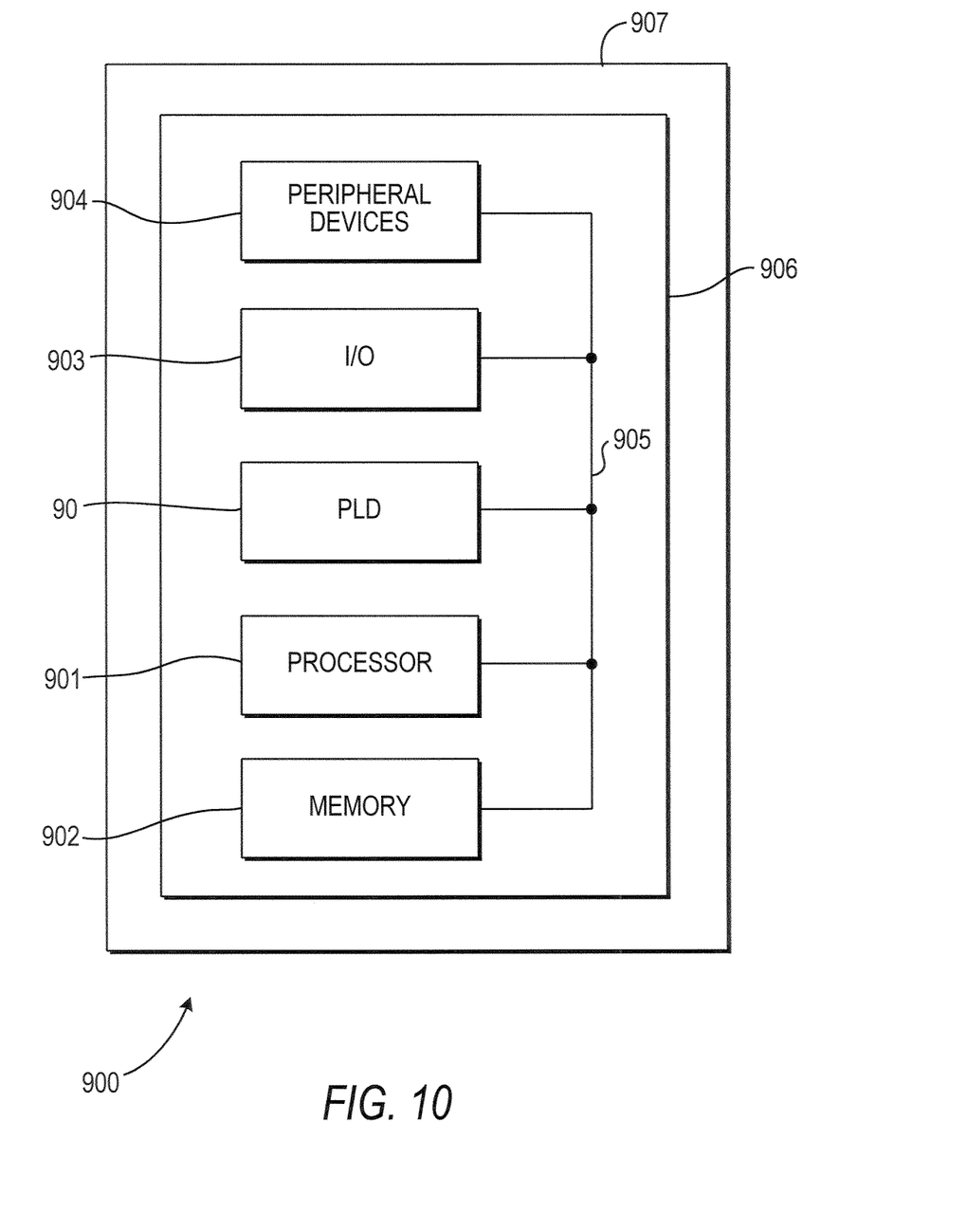
FIG. 10 is a simplified block diagram of an illustrative system employing a programmable logic device incorporating the present invention.

System 900 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions. For example, PLD 90 can be configured as a processor or controller that works in cooperation with processor 901. PLD 90 may also be used as an arbiter for arbitrating access to a shared resources in system 900. In yet another example, PLD 90 can be configured as an interface between processor 901 and one of the other components in system 900. It should be noted that system 900 is only exemplary, and that the true scope and spirit of the invention should be indicated by the following claims.

Various technologies can be used to implement PLDs 90 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a programmable integrated circuit device in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. A method of configuring a programmable integrated circuit device to perform a multiplication operation on a number of multiplicand input values each having a first plurality of bits, wherein:
   said programmable integrated circuit device incorporates multiplier circuits for multiplicand input values each having a second plurality of bits,
   said multiplier circuits are grouped into specialized processing blocks,
   each of said specialized processing blocks comprises only two of said multiplier circuits, and further comprises combinatorial circuitry for combining outputs of said two of said multiplier circuits, and
   said programmable integrated circuit device further comprises interconnection conductors for selectably connecting output of at least one multiplier circuit in a first one of said specialized processing blocks to said combinatorial circuitry in at least a second one of said specialized processing blocks; said method comprising:
   configuring logic of said programmable integrated circuit device to break up each of said multiplicand input values into a plurality of segments, each segment having said second plurality of bits, a first one of said segments of one of said multiplicand input values being of greater significance than a second one of said segments of said one of said multiplicand input values, said second one of said segments being of lesser significance;
   configuring logic of said programmable integrated circuit device for adding together, for each of said multiplicand input values, said segments of greater significance and lesser significance, to create a respective sum for each of said multiplicand values;
   configuring logic of said programmable integrated circuit device for multiplying together said segments of greater significance using a first one of said multiplier circuits, for multiplying together said segments of lesser significance using a second one of said multiplier circuits, and for multiplying together said sums using a third one of said multiplier circuits, said configuring logic of said programmable integrated circuit device for multiplying comprises configuring said interconnection conductors to connect output of at least one multiplier circuit in said first one of said specialized processing blocks to said combinatorial circuitry in said at least a second one of said specialized processing blocks; and
   configuring logic of said programmable integrated circuit device to shift outputs of said first and second ones of multiplier circuits by respective amounts and to combine outputs of said first, second and third ones of said multiplier circuits according to a recursive decomposition of said multiplication operation.

2. The method of claim 1 wherein said recursive decomposition is a Karatsuba decomposition.

3. The method of claim 1 wherein:
   said programmable integrated circuit device further includes input adder circuits; and
   said configuring logic of said programmable integrated circuit device for adding comprises:
   routing said segments to at least one of said input adder circuits, and
   routing output of said at least one of said input adder circuits to at least one input of said multiplier circuits.

4. A programmable integrated circuit device configured to perform a multiplication operation on a number of multiplicand input values each having a first plurality of bits, wherein:
   said programmable integrated circuit device incorporates multiplier circuits for multiplicand input values each having a second plurality of bits,
   said multiplier circuits are grouped into specialized processing blocks,
   each of said specialized processing blocks comprises only two of said multiplier circuits, and further comprises combinatorial circuitry for combining outputs of said two of said multiplier circuits, and
   said programmable integrated circuit device further comprises configurable interconnection conductors configured to connect output of at least one multiplier circuit in a first one of said specialized processing blocks to said combinatorial circuitry in at least a second one of said specialized processing blocks, said configured programmable logic device comprising:
   logic configured to break up each of said multiplicand input values into a plurality of segments, each segment having said second plurality of bits, a first one of said segments of one of said multiplicand input values being of greater significance than a second one of said segments of said one of said multiplicand input values, said second one of said segments being of lesser significance;

logic configured for adding together, for each of said multiplicand input values, said segments of greater significance and lesser significance, to create a respective sum for each of said multiplicand values;

logic configured for multiplying together said segments of greater significance using a first one of said multiplier circuits, multiplying together said segments of lesser significance using a second one of said multiplier circuits, and multiplying together said sums using a third one of said multiplier circuits; and logic configured to shift outputs of said first and second ones of multiplier circuits by respective amounts and to combine outputs of said first, second and third ones of said multiplier circuits according to a recursive decomposition of said multiplication operation.

5. The programmable integrated circuit device of claim 4 wherein said recursive decomposition is a Karatsuba decomposition.

6. The programmable integrated circuit device of claim 4 further comprising:

input adder circuits; wherein:

said logic configured for adding comprises:

configurable routing configured to connect said segments to at least one of said input adder circuits, and to route output of said at least one of said input adder circuits to at least one input of said multiplier circuits.

7. The programmable integrated circuit device of claim 4 wherein said at least a second one of said specialized processing blocks comprises ones of said specialized processing blocks adjacent to both sides of said first one of said specialized processing blocks.

8. A non-transitory machine-readable data storage medium encoded with machine-executable instructions for configuring a programmable integrated circuit device to perform a multiplication operation on a number of multiplicand input values each having a first plurality of bits, wherein:

said programmable integrated circuit device incorporates multiplier circuits for multiplicand input values each having a second plurality of bits, said multiplier circuits are grouped into specialized processing blocks, each of said specialized processing blocks comprises only two of said multiplier circuits, and further comprises combinatorial circuitry for combining outputs of said two of said multiplier circuits, and said programmable integrated circuit device further comprises interconnection conductors for selectably connecting output of at least one multiplier circuit in a first one of said specialized processing blocks to said combinatorial circuitry in at least a second one of said specialized processing blocks, said instructions comprising:

instructions to configure logic of said programmable integrated circuit device to break up each of said multiplicand input values into a plurality of segments, each segment having said second plurality of bits, a first one of said segments of one of said multiplicand input values being of greater significance than a second one of said segments of said one of said multiplicand input values, said second one of said segments being of lesser significance;

instructions to configure logic of said programmable integrated circuit device for adding together, for each of said multiplicand input values, said segments of greater significance and lesser significance, to create a respective sum for each of said multiplicand values;

instructions to configure logic of said programmable integrated circuit device for multiplying together said segments of greater significance using a first one of said multiplier circuits, for multiplying together said segments of lesser significance using a second one of said multiplier circuits, and for multiplying together said sums using a third one of said multiplier circuits, said instructions to configure logic of said programmable integrated circuit device for multiplying comprise instructions to configure said interconnection conductors to connect output of at least one multiplier circuit in said first one of said specialized processing blocks to said combinatorial circuitry in said at least a second one of said specialized processing blocks; and instructions to configure logic of said programmable integrated circuit device to shift outputs of said first and second ones of multiplier circuits by respective amounts and to combine outputs of said first, second and third ones of said multiplier circuits according to a recursive decomposition of said multiplication operation.

9. The non-transitory machine-readable data storage medium of claim 8 wherein said recursive decomposition is a Karatsuba decomposition.

10. The non-transitory machine-readable data storage medium of claim 8 wherein:

said programmable integrated circuit device further includes input adder circuits; and said instructions to configure logic of said programmable integrated circuit device for adding comprise:

instructions to configure routing of said segments to at least one of said input adder circuits, and instructions to configure routing output of said at least one of said input adder circuits to at least one input of said multiplier circuits.

* * * * *